US012566256B2

(12) United States Patent (10) Patent No.: US 12,566,256 B2
Petrov (45) Date of Patent: Mar. 3, 2026

(54) MULTIPLE-INPUT, MULTIPLE-OUTPUT RADAR SYSTEM WITH RANGE-DOPPLER CIRCULATING CHIRPS

(71) Applicant: NXP B.V., Eindhoven (NL)

(72) Inventor: Nikita Petrov, Helmond (NL)

(73) Assignee: NXP B.V., Eindhoven (NL)

( * ) Notice: Subject to any disclaimer, the term of this patent is extended or adjusted under 35 U.S.C. 154(b) by 367 days.

(21) Appl. No.: 18/123,041

(22) Filed: Mar. 17, 2023

(65) Prior Publication Data

US 2024/0310505 A1 Sep. 19, 2024

(51) Int. Cl.
*G01S 13/58* (2006.01)
*G01S 7/35* (2006.01)
*G01S 7/481* (2006.01)
*G01S 13/28* (2006.01)
(52) U.S. Cl.
CPC ............ *G01S 13/584* (2013.01); *G01S 7/356* (2021.05); *G01S 7/4815* (2013.01); *G01S 13/282* (2013.01)
(58) Field of Classification Search
CPC ...... G01S 13/584; G01S 7/356; G01S 7/4815; G01S 13/282; G01S 7/35; G01S 13/343; G01S 13/42; G01S 13/931; G01S 7/42
See application file for complete search history.

(56) References Cited

U.S. PATENT DOCUMENTS

| | | | |
|---|---|---|---|
| 2021/0173042 A1* | 6/2021 | Wu | ......................... G01S 7/356 |
| 2021/0173069 A1 | 6/2021 | Wu et al. | |
| 2021/0333386 A1 | 10/2021 | Park et al. | |
| 2022/0196795 A1 | 6/2022 | Wu et al. | |

OTHER PUBLICATIONS

N. Petrov, "Range-Doppler Circulating LFM for Automotive MIMO Radars," 2023 20th European Radar Conference (EuRAD), Berlin, Germany, 2023, pp. 169-172, (Year: 2023).*
Roussel et al., "Optimization of Low Sidelobes Radar Waveforms: Circulating Codes," 2014 International Radar Conference. IEEE, Oct. 13-17, 2014, 6 pages.
Babur et al., "Nearly orthogonal waveforms for mimo fmcw radar," IEEE Transactions on Aerospace and Electronic Systems, vol. 49, No. 3, pp. 1426-1437, Jul. 2013.
(Continued)

*Primary Examiner* — Robert W Hodge
*Assistant Examiner* — Bongani Jabulani Mashele

(57) ABSTRACT
A system includes first and second transmitters, a receiver, a processor, and a non-transitory computer-readable medium. The processor causes the first and second transmitters to transmit first and second chirp signals, respectively. The second chirp signal has an in-band frequency offset in fast-time and slow-time and at least one of a carrier frequency offset in slow-time and a phase offset relative to the first chirp signal. The processor causes the receiver to receive reflections of the chirp signals off of objects in the environment, resulting in a received radar signal. The processor performs a range fast Fourier transform (FFT) and a Doppler FFT on the received radar data to obtain a range-Doppler-antenna data cube. The processor performs range-Doppler alignment of reflections of the first and second chirp signals and phase correction based on the phase offset. The processor then performs digital beamforming.

20 Claims, 5 Drawing Sheets

(56) References Cited

OTHER PUBLICATIONS

Babur et al. "Space-Time Radar Waveforms: Circulating Codes," Journal of Electrical and Computer Engineering, Aug. 1, 2013, 9 pages.

Sun et al., "Analysis and comparison of mimo radar waveforms," 2014 International Radar Conference. IEEE, Oct. 13-17, 2014, pp. 1-6.

Gini et al. Editors of "Waveform Design and Diversity for Advanced Radar Systems," emphasis on Chapter 4 and Chapter 9, IET, Radar, Sonar and Navigation Series 22, Jan. 2012, 574 pages.

Le Chevalier, Francois "Chapter 12: Wideband wide beam motion sensing," from Advanced Ultrawideband Radar book, CRC Press, Dec. 2016, 42 pages.

Babur et al., "Simple transmit diversity technique for phased array radar," IET Radar, Sonar & Navigation, vol. 10, No. 6, pp. 1046-1056, Nov. 22, 2015.

Faucon et al., "Mismatched filtering for circulating space-time codes," IET International Radar Conference 2015, Oct. 14-16, 2015, 7 pages.

Li et al., "Transmit diversity technique based on joint slow-time coding with circulating code," IET Radar, Sonar & Navigation, vol. 11, No. 8, Jun. 30, 2017, pp. 1243-1250.

* cited by examiner

DOPPLER DIVISION
MULTIPLEXING 210

RANGE DIVISION
MULTIPLEXING 230

RANGE CIRCULATING LINEAR
FREQUENCY MODULATION 250

DOPPLER CIRCULATING LINEAR
FREQUENCY MODULATION 270

RANGE-DOPPLER CIRCULATING LINEAR
FREQUENCY MODULATION 290

TX(A) RANGE-DOPPLER MAP 410

TX(B) RANGE-DOPPLER MAP 420

TX(C) RANGE-DOPPLER MAP 430

ALIGNED RANGE-DOPPLER MAP 440

MULTIPLE-INPUT, MULTIPLE-OUTPUT RADAR SYSTEM WITH RANGE-DOPPLER CIRCULATING CHIRPS

BACKGROUND

Some radar systems are included in vehicles as part of automated driving assistance systems and used to assist in perception of environments around the vehicles. To accurately represent the environment, the angle or direction of arrival of a signal reflected off an object in the environmental relative to a radar system is determined. For a phased array radar system that is limited in size and has a small number of antenna elements, the angular resolution can be improved by using different antenna arrays to transmit and receive simultaneously, resulting in a multiple-input, multiple-output (MIMO) radar system. The spatial convolution of collocated arrays results in a virtual array that has better angular resolution, smaller grating lobes, or both than a pattern of transmitter or receiver antenna arrays individually. To generate the virtual array, the received signals are associated with the transmitter from which the signal was transmitted using multiplexing.

Common multiplexing techniques can improve angular resolution, but reduce performance in other areas. For example, time division multiplexing, Doppler division multiplexing, and range division multiplexing reduce the maximum unambiguous range, velocity, or both. As another example, range circulating linear frequency modulation and Doppler circulating linear frequency modulation reduce the range resolution or Doppler resolution, respectively. Some multiplexing techniques require complicated analog notch filters and high sampling frequency analog-to-digital converters compared to operating a single transmitter at a time, which uses a high pass filter and low sampling frequency analog-to-digital converters.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

As discussed previously herein, some techniques for multiplexing multiple-input, multiple-output (MIMO) radar systems result in limited maximum unambiguous ranges and velocities, limited range and velocity resolution, and the like. The disclosed techniques and radar systems implementing the disclosed techniques are able to multiplex transmitted signals without limiting the maximum unambiguous range and velocity or limiting the range and velocity resolution. The disclosed range-Doppler circulating linear frequency modulation multiplexing technique introduces a carrier frequency offset, an in-band frequency offset, a phase offset, or a combination of thereof into the chirp signals transmitted by transmitters in the MIMO radar system relative to each other, such that the range-Doppler images for transmitters show peaks offset from each other in both range and Doppler. The carrier frequency offset, the in-band frequency offset, and the phase offset can be cancelled out from the received radar data, such that the range and velocity information about objects in the environment remains and the maximum unambiguous range, maximum unambiguous velocity, range resolution, and Doppler resolution remain the same as in a radar system with a single transmitter operating at a time.

Figure 1:
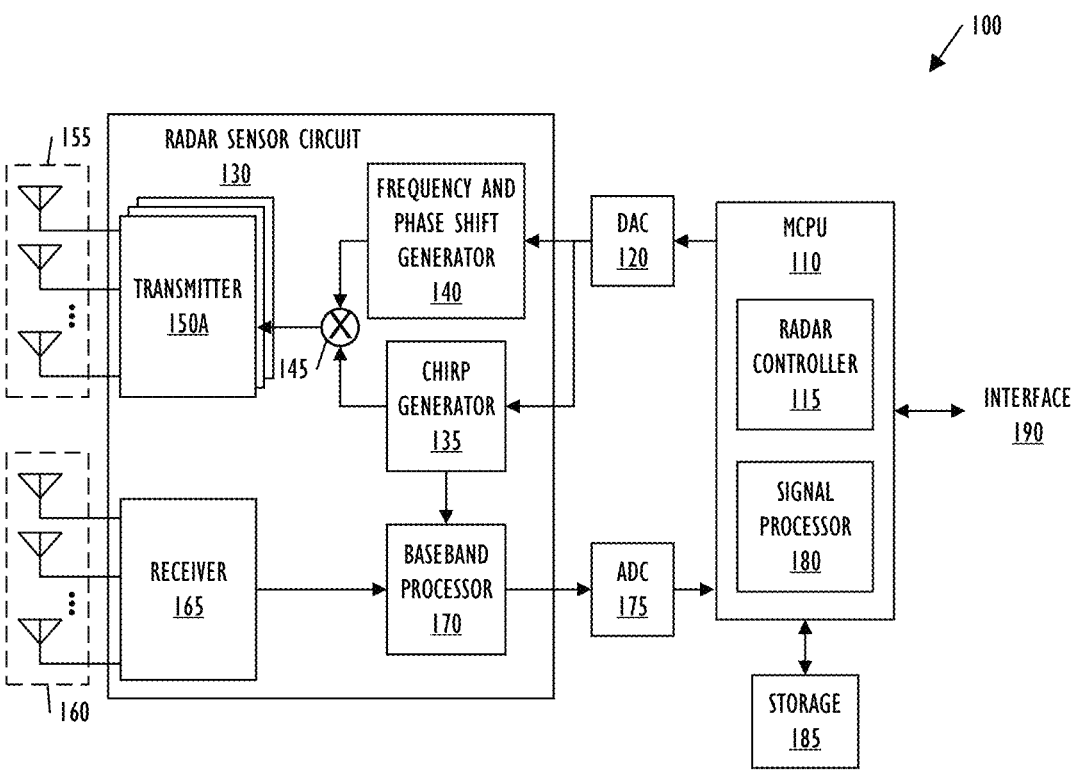
FIG. 1 shows, in block diagram form, an example radar system, according to one embodiment.

FIG. 1 shows, in block diagram form, an example radar system 100, according to an embodiment. Radar system 100 can be included in a vehicle, such as for an automotive driver assistance system. The example radar system 100 is a frequency-modulated continuous wave (FMCW) radar system, also referred to as a continuous-wave frequency-modulated (CWFM) radar, and capable of determining the distance or range, velocity, and angle of arrival of an object in the field of view of radar system 100. The term "angle of arrival" or "direction of arrival" of an object is used herein to indicate the angle of arrival of a signal reflected off the object relative to the alignment of the radar system.

In this example, radar system 100 includes a microcontroller and processor unit (MCPU) 110, a digital-to-analog converter (DAC) 120, a radar sensor circuit 130, a first antenna array 155, a second antenna array 160, an analog-to-digital converter (ADC) 175, and storage 185. The MCPU 110 comprises one or more MCPU cores, general purpose processing cores, array or vector processing cores, parallel processing cores, graphic processing units, neural net and linear algebra accelerators, field-programmable gate arrays, digital signal processors, application-specific integrated circuits, and the like, or any combination thereof. The term "MCPU" in the singular is used herein to refer to either a single or multiple of the MCPU cores, general purpose processing cores, array or vector processing cores, parallel processing cores, graphic processing units, digital signal processors, neural net and linear algebra accelerators, application-specific integrated circuits, field-programmable gate arrays, and the like, or any combination thereof comprised in the MCPU 110.

MCPU 110 includes a radar controller 115 and a signal processor 180. The radar controller 115 can receive data from the radar sensor circuit 130 and control radar parameters of the radar sensor circuit 130 such as frequency band, length of a radar frame, and the like via the DAC 120. A control signal from DAC 120 can be used to adjust the radar chirp signals output from a chirp generator 135 included in radar sensor circuit 130. The signal processor 180 in MCPU 110 can also receive the data from the radar sensor circuit 130 and perform signal processing for determining a distance or range between a target object and radar system 100, a radial velocity of the target object, an angle of arrival for the target object, and the like. The signal processor 180 can provide the calculated values to the storage 185 and/or to other systems via the interface 190.

The interface 190 can enable the MCPU 110 to communicate with other systems over local and wide area networks, the internet, automotive communication buses, and/or other kinds of wired or wireless communication systems, for example. The MCPU 110 can provide the calculated values over the interface 190 to other systems, such as a radar-camera-lidar fusion system; an automated driving assistance system including parking, braking, or lane-change assistance features; and the like. The storage 185 can be used to store instructions for the MCPU 110, received data from the radar sensor circuit 130, calculated values from the signal processor 180, and the like. Storage 185 can be any appropriate storage medium, such as a volatile or non-volatile memory.

The radar sensor circuit 130 includes the chirp generator 135, a frequency and phase shift generator 140, a mixer 145, a set of three transmitters 150A-C, a receiver 165, and a baseband processor 170. For ease of illustration, the radar sensor circuit 130 includes three transmitters 150A-C and a single receiver 165, but in other implementations, the radar sensor circuit 130 can include any number of transmitters 150 and any number of receivers 165, such that radar system 100 is a multiple-input, multiple-output (MIMO) radar system. In some implementations, the radar sensor circuit 130 includes a unique chirp generator 135, frequency and phase shift generator 140, and mixer 145 for each transmitter 150. In other implementations, the radar sensor circuit 130 includes a unique mixer 145 for each transmitter 150 but a single chirp generator 135 and frequency and phase shift generator 140 for all the transmitters 150.

The chirp generator 135 can include a local oscillator, for example, and generates radar chirp signals and provides them to the mixer 145. For example, the chirp generator 135 can frequency modulate a continuous wave signal to form a series of linear chirp signals based on a control signal from the radar controller 115. The transmitted chirp signal of a known, stable frequency continuous wave varies up and down in frequency over a fixed period of time by the modulated signal. The mixer 145 combines the chirp signal from the chirp generator 135 and a particular shift signal from the frequency and phase shift generator 140, and provides the resulting signal to the transmitter 150 corresponding to the particular shift signal.

That is, the frequency and phase shift generator 140 implements an in-band frequency shift and at least one of a phase shift and a carrier frequency shift for each unique transmitter 150, such that a first chirp signal provided to the first transmitter 150A is unshifted, a second chirp signal provided to the second transmitter 150B has a first frequency shift and first phase shift relative to the first chirp signal provided to the first transmitter 150A, and a third chirp signal provided to the third transmitter 150C has a second frequency shift and a second phase shift relative to the first chirp signal provided to the first transmitter 150A. The different frequency shifts and phase shifts applied to the transmitters 150 allow the reflected signals to be distinguished by transmitter during signal processing by the signal processor 180. The frequency shift generated by the phase and frequency shift generator 140 shifts the chirp signals within the bandwidth of the radar system 100, shifts the carrier frequency of the chirp signals, or both. The frequency and phase shift generator 140 can introduce an in-band frequency shift within a single chirp and across multiple sequential chirps in a chirp frame. That is, the frequency and phase shift generator 140 can introduce an in-band frequency shift over fast-time, within a single chirp, and over slow-time, from chirp to chirp in the chirp frame. The frequency and phase shift generator 140 can also introduce a carrier frequency shift over slow-time.

The mixer 145 provides the generated chirp signals to the corresponding transmitter 150, which drives a first antenna in the first antenna array 155 of one or more transmitter (TX) antennas. The second antenna array 160 comprises one or more receiver (RX) antennas and receives signals reflected from objects in the path of the transmitted chirp signals from the TX antenna array 155. The TX antenna array 155 and the RX antenna array 160 can be stationary or configured to transmit and receive across a range of area, such as by mechanical movement.

The receiver 165 receives the reflected signals from the RX antenna array 160 and provides them to the baseband processor 170. The baseband processor 170 also receives the transmitted chirp signals from the chirp generator 135 and down-converts the received chirp signals directly into the baseband using the copy of the transmitted chirp signals from the chirp generator 135. The baseband processor 170 can then filter and amplify the baseband signal. The baseband processor 170 provides the filtered and amplified baseband signal to the ADC 175, which digitizes the signal and provides it to the MCPU 110. The signal processor 180 in the MCPU 110 can then perform time domain to frequency domain transforms such as fast Fourier transforms (FFTs) and other signal processing to determine the distance, radial velocity, and angle of arrival between the target object and the radar system 100.

Frequency differences between the received reflections and the transmitted chirp signal increase with delay and so are proportional to distance. The phase differences between the received reflections across consecutive chirps in a radar frame are indicative of the velocity of objects in the field of view. For implementations in which RX antenna array 150 includes two or more receiver antennas, the phase difference between received reflections at a first RX antenna and received reflections at a second RX antenna can be used to determine the angle of arrival of target objects. For example, the down-converted and digitized receive signal corresponding to each chirp is first transformed using an FFT (called the range FFT). The range FFT produces a series of range bins with the value of each range bin denoting the signal strength of reflected targets at the corresponding range. A further "Doppler" FFT is then performed for each range bin across all the chirps in a frame to estimate the velocities of reflected targets. Additional processing can then be performed to determine the angle of arrival between the targets and the radar system 100. Although the radar system 100 is described herein as implementing FFT-based range-Doppler processing, any appropriate transforms may be used to produce the range-Doppler information.

For an implementation in which the radar system 100 includes multiple transmitters 150 and receivers 165, the resulting virtual antenna array has a better angular resolution, fewer grating lobes, or both than a pattern of transmitter or receiver arrays individually. To generate a virtual antenna array, MIMO radar multiplexing is performed to distinguish which received signal corresponds to which transmitted signal. Time division multiplexing separates transmitter channels in the time domain, such that transmitters transmit chirp signal sequentially in time. As a result, the instantaneous transmitter power is limited to a single transmitter, and the maximum unambiguous velocity is reduced by the number of transmitter channels. Other common MIMO radar multiplexing techniques are described further herein with respect to FIG. 2.

Figure 2:
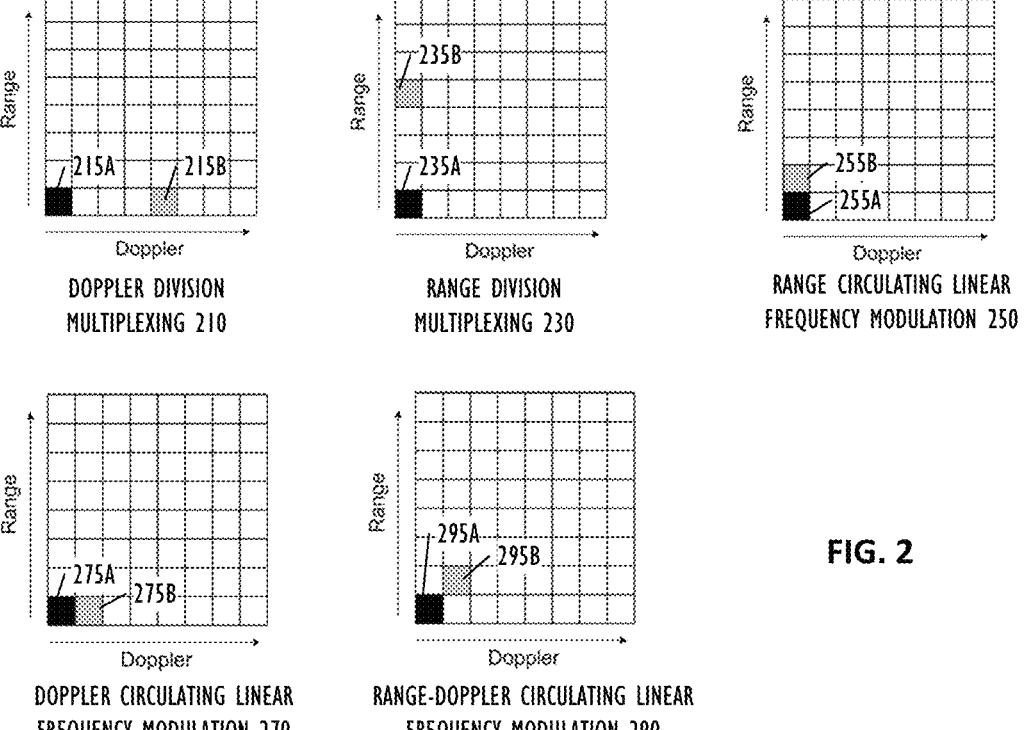
FIG. 2 shows diagrams of common multiple-input, multiple-output (MIMO) radar multiplexing techniques and an example diagram of a range-Doppler circulating linear frequency modulation (LFM) technique according to one embodiment.

FIG. 2 shows diagrams of common MIMO radar multiplexing techniques and an example diagram of a range-Doppler circulating linear frequency modulation (LFM) technique according to one embodiment. Diagram 210 illustrates a range-Doppler image corresponding to two transmitters and the Doppler division multiplexing technique. The Doppler division multiplexing technique separates transmitter signals in Doppler by splitting the Doppler interval into a number N of equal blocks, where N is the number of simultaneously transmitting channels. For example as shown in diagram 210, a signal from the first transmitter reflects off an object having a range and velocity as indicated by the shaded cell 215A. A signal from the second transmitter reflects off the same object but indicates a velocity offset from the actual velocity, as indicated by the shaded cell 215B. As a result of the Doppler offsets, the maximum unambiguous velocity able to be determined by the radar system is reduced by a factor of N.

Diagram 230 illustrates a range-Doppler image corresponding to two transmitters and the range division multiplexing technique. The range division multiplexing technique separates transmitter signals in range by splitting the range interval into a number N of equal blocks, where N is the number of simultaneously transmitting channels. For example as shown in diagram 230, a signal from the first transmitter reflects off an object having a range and velocity as indicated by the shaded cell 235A. A signal from the second transmitter reflects off the same object but indicates a range offset from the actual range, as indicated by the shaded cell 235B. As a result of the range offsets, the maximum unambiguous range able to be determined by the radar system is reduced by a factor of N. In addition, direct transmitter to receiver coupling introduces high-frequency tones into the received signals, such that a complicated analog notch filter is required to filter out the direct coupling noise, instead of a high-pass filter.

Diagram 250 illustrates a range-Doppler image corresponding to two transmitters and the range circulating linear frequency modulation (LFM) multiplexing technique. The range circulating LFM multiplexing technique separates transmitter signals in range by a single range cell. For example as shown in diagram 250, a signal from the first transmitter reflects off an object having a range and velocity as indicated by the shaded cell 255A. A signal from the second transmitter reflects off the same object but indicates a single cell range offset from the actual range, as indicated by the shaded cell 255B. While the maximum unambiguous range able to be determined by the radar system is maintained, the range resolution of the radar system is reduced by the number N of transmitter channels.

Diagram 270 illustrates a range-Doppler image corresponding to two transmitters and the Doppler circulating LFM multiplexing technique. The Doppler circulating LFM multiplexing technique separates transmitter signals in Doppler by a single Doppler cell. For example as shown in diagram 270, a signal from the first transmitter reflects off an object having a range and velocity as indicated by the shaded cell 275A. A signal from the second transmitter reflects off the same object but indicates a single cell Doppler offset from the actual velocity, as indicated by the shaded cell 275B. While the maximum unambiguous velocity able to be determined by the radar system is maintained, the velocity resolution of the radar system is reduced by the number N of transmitter channels.

Figure 3:
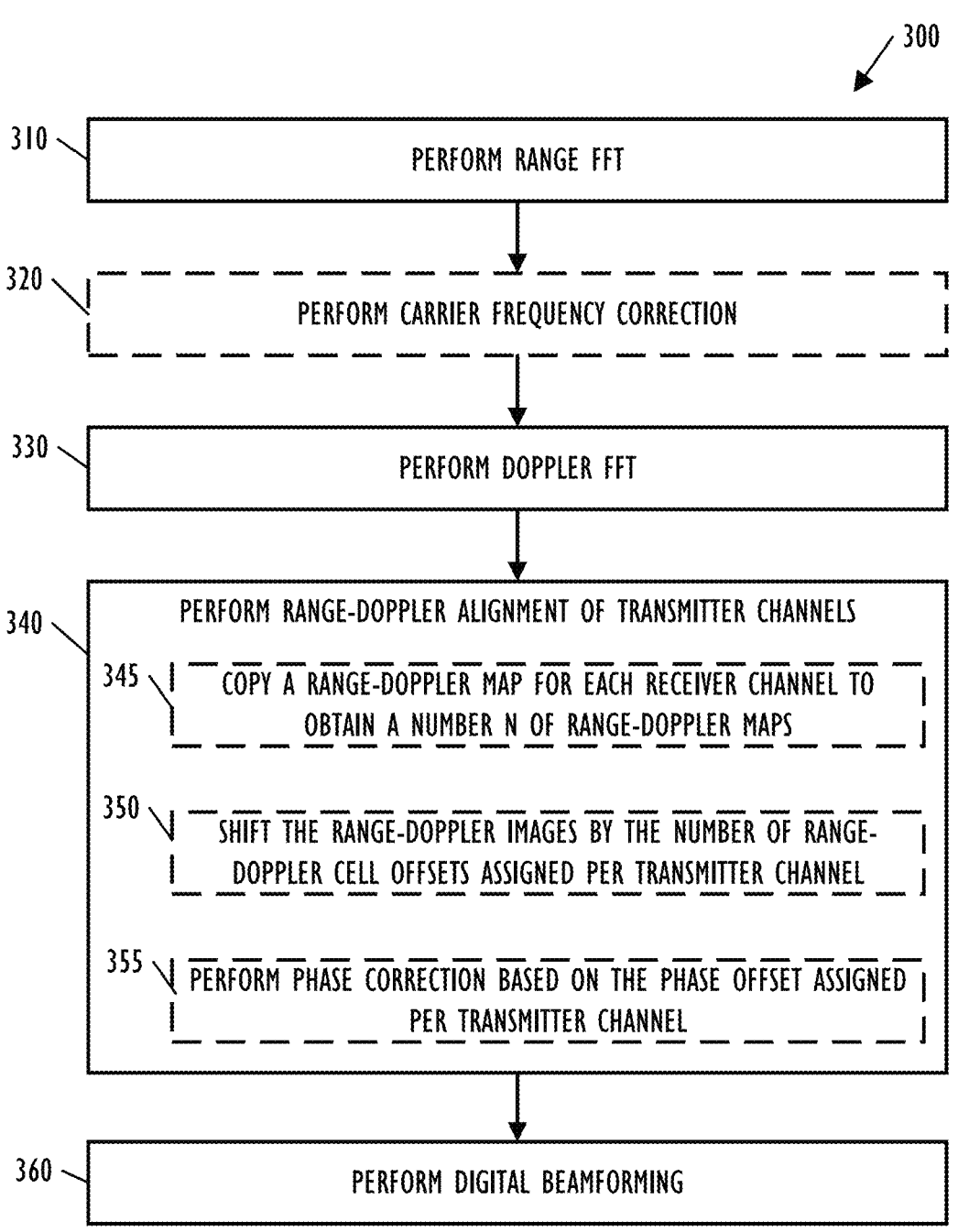
FIG. 3 shows, in flow chart form, an example process for analyzing received radar data from a MIMO radar system implementing a range-Doppler circulating linear frequency modulation (LFM) technique, according to one embodiment.

Diagram 290 illustrates a range-Doppler image corresponding to two transmitters and a range-Doppler circulating LFM multiplexing technique as described further herein with respect to FIG. 3. The range-Doppler circulating LFM multiplexing technique separates transmitter signals in both range and Doppler by a single cell in this example, preserving the maximum unambiguous velocity and range able to be determined by the radar system, as well as the range and velocity resolution. For example as shown in diagram 290, a signal from the first transmitter reflects off an object having a range and velocity as indicated by the shaded cell 295A. A signal from the second transmitter reflects off the same object but indicates a single cell range offset from the actual range and a single cell Doppler offset from the actual velocity, as indicated by the shaded cell 295B. Offsets of a few cells or a partial cell in both range and Doppler simplify the filtering requirements compared to other multiplexing techniques and maintain the maximum unambiguous range and velocity and range and velocity resolution.

In this example, the transmitters are offset by a single cell, but in other implementations, a different number of cell offset or a partial cell offset can be used. The number of cells by which the transmitter are offset in both range and Doppler can be chosen based on the desired implementation and can vary between a quarter of a cell to four cells. Although diagram 290 shows the same offset in both range and Doppler, in other implementations, a first offset can be applied in range and a second offset can be applied in Doppler. For example, a half cell offset can be applied in range and a full cell offset can be applied in Doppler.

FIG. 3 shows, in flow chart form, an example process 300 for analyzing received radar data from a MIMO radar system implementing a range-Doppler circulating LFM technique, according to one embodiment. For ease of illustration, the process 300 is described herein with reference to the radar system 100 shown in FIG. 1 and the diagrams shown in FIG. 2. The process 300 is described herein as being performed by the signal processor 180 in the MCPU 110 executing instructions stored in storage 185 of the radar system 100, but can be performed by any appropriate processing unit executing instructions stored in any appropriate non-transitory computer-readable medium. The steps of process 300 are shown in a particular order in FIG. 3, but the steps of process 300 may be performed in a different order and/or some steps may be performed simultaneously. One or more steps of process 300 can be optional, and process 300 can include additional steps.

The process 300 begins at step 310, at which the signal processor 180 performs a range FFT to obtain a range-slow-time-antenna data cube. In some implementations, a windowing function is applied as part of the range FFT. In implementations in which the frequency and phase shift generator 140 shifts the carrier frequency of chirps, the signal processor 180 performs carrier frequency correction at optional step 320. For example, a first carrier frequency shift is applied to the chirp signal for the second transmitter 150B relative to the chirp signal for the first transmitter 150A, such that the chirp signal for the second transmitter 150B is fast-time shifted relative to the chirp signal for the first transmitter 150A. A second carrier frequency shift is applied to the chirp signal for the third transmitter 150C relative to the chirp signal for the first transmitter 150A, such that the chirp signal for the third transmitter 150C is fast-time shifted relative to the chirp signal for the first transmitter 150A. The second carrier frequency shift for the third transmitter 150C is different from the first carrier frequency shift for the second transmitter 150B. In some implementations, the carrier frequency shifts vary from 10 kiloHertz (kHz) to 40 kHz. At optional step 320, the signal processor 180 applies a third carrier frequency shift to the range-slow-time-antenna data cube corresponding to the chirp signal from the second transmitter 150B, such that the first carrier frequency shift applied by the frequency and phase shift generator 140 is cancelled out. The signal processor 180 applies a fourth carrier frequency shift to the range-slow-time-antenna data cube corresponding to the chirp signal from the third transmitter 150C, such that the second carrier frequency shift applied by the frequency and phase shift generator 140 is cancelled out.

At step 330, the signal processor 180 performs a Doppler FFT to obtain a range-Doppler-antenna data cube that indicates a signal strength for the received radar data at each range bin and velocity bin. In some implementations, a windowing function is applied as part of the Doppler FFT. The windowing function can be the same or different from the windowing function applied during the range FFT. At step 340, the signal processor 180 performs range-Doppler alignment of the transmitter channels. That is, the signal processor 180 applies frequency and phase shifts to the range-Doppler-antenna data cubes to cancel out the slow-time and fast-time frequency shifts and any phase shifts applied by the frequency and phase shift generator 140. For example, the frequency and phase shift generator 140 applies a 10 Hertz (Hz) frequency shift (such that the resulting chirp signal remains within the bandwidth of the radar system 100) and a 30 degree phase shift to the chirp signal for the second transmitter 150B relative to the chirp signal for the first transmitter 150A. At step 340, the signal processor 180 applies a negative 10 Hz frequency shift and a negative 30 degree phase shift to the received signal corresponding to reflections of the chirp signal transmitted by the second transmitter 150B.

Step 340 can include optional steps 345, 350, and 355, in some implementations. At optional step 345, the signal processor 180 copies a range-Doppler map for each receiver channel to obtain a number N of range-Doppler maps that is equal to the number of transmitter channels. For example, the range-Doppler array corresponding to the receiver 165 is copied three times, one for each of transmitters 150A-C. At optional step 350, the signal processor 180 shifts the range-Doppler images by the number of range-Doppler cell offsets assigned per transmitter channel. For example, the 10 Hz frequency shift and 30 degree phase shift applied to the chirp signal for the second transmitter 150B relative to the chirp signal for the first transmitter 150A corresponds to a single range cell shift and a single Doppler cell shift. The signal processor 180 shifts the occupied cells in the range-Doppler array corresponding to the transmitter 150B by a single range cell and a single Doppler cell. A peak search across range and Doppler can be used to estimate the velocity and range of the object.

Figure 4:
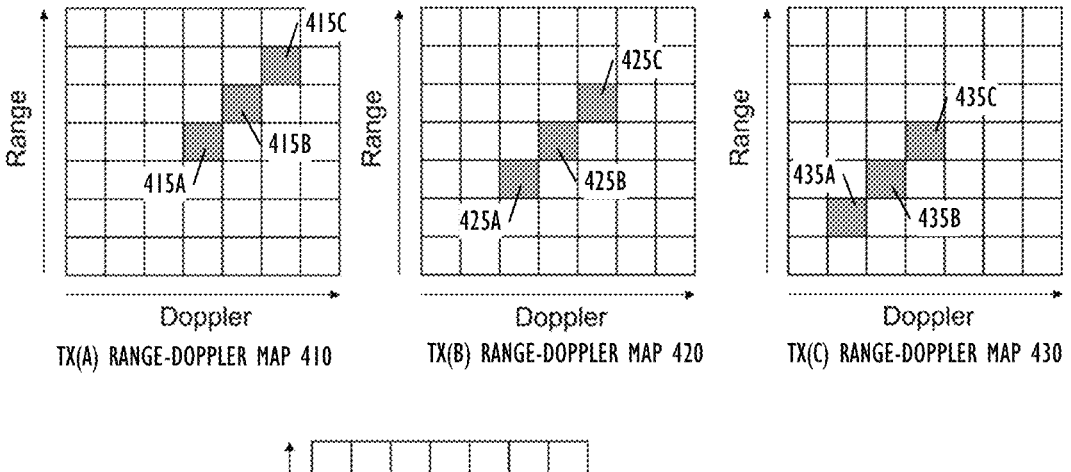
FIG. 4 shows diagrams for aligning the range-Doppler maps for three transmitters, according to one embodiment.

For example as shown in FIG. 4, diagram 410 shows the range-Doppler map corresponding to the aligned transmitter 150A. No frequency or phase shift is applied to the chirp signal transmitted by transmitter 150A, and the range-Doppler map 410 shows occupied cells at 415A, 415B, and 415C. Diagram 420 shows the range-Doppler map corresponding to the aligned transmitter 150B. A single range cell and a single Doppler cell shift was applied to the chirp signal transmitted by transmitter 150B and corrected for at optional step 350. The resulting range-Doppler map 420 shows occupied cells at 425A, 425B, and 425C, which are shifted by one range cell and one Doppler cell relative to the occupied cells 415A, 415B, and 415C in range-Doppler map 410. Diagram 430 shows the range-Doppler map corresponding to the aligned transmitter 150C.

A shift of two range cells and two Doppler cells was applied to the chirp signal transmitted by transmitter 150C and corrected for at optional step 350. The resulting range-Doppler map 430 shows occupied cells at 435A, 435B, and 435C, which are shifted by two range cells and two Doppler cells relative to the occupied cells 415A, 415B, and 415C in range-Doppler map 410. The aligned range-Doppler map 440 shows the three range-Doppler maps 410, 420, and 430 overlaid, with a peak at cell 445, where cell 415A from diagram 410, cell 425B from diagram 420, and cell 435C from diagram 430 overlap.

Returning to process 300 shown in FIG. 3, at optional step 355, the signal processor 180 performs phase correction based on the phase offset assigned per transmitter channel. The virtual array response at the signal peak at cell 445 in the diagram 440 can be represented as:

$$s_k = \alpha \left( e^{-j2\pi\delta_f \tau_0 k} \right) \left( e^{j\varphi_k} \right) \left( e^{j2\pi f_{a,0,k}} \right)$$

where k represents the transmitter channel index; a represents a complex scattering coefficient of the object in the environment, phase due to signal propagation, and other system-level parameter constants that are the same for all transmitters; $\delta_f$ represents the fast-time frequency shift applied by the frequency and phase shift generator 140; $\tau_0$ represents a time delay of the received signal that is proportional to the range of the object in the environment; $\varphi_k$ represents the initial phase per transmitter k; and $f_{a,0,k}$ represents the spatial frequency of the object per transmitter k.

A first constant phase correction is applied per transmitter to compensate for the phase shift applied per transmitter by the frequency and phase shift generator 140, for example by multiplying by the complex conjugate of the phase shift $e^{j\varphi k}$. The phase shift $e^{j\varphi k}$ can be chosen to center the field of view in the middle of the chirp frame and in the middle of the acquisition period. The phase correction is shown here at optional step 355, but can be performed at any time in process 300. A second, fast-time delay-dependent phase correction is applied per transmitter to compensate for the phase shift $e^{-j2\pi\delta_f \tau_0 k}$ applied by the frequency and phase shift generator 140. For example, the delay-dependent phase correction can be applied per range bin based on the known slope of the chirp signal. In some implementations, the second, fast-time delay-dependent phase correction can be performed at any time after the range FFT is performed at step 310. At step 360, the signal processor 180 performs digital beamforming to determine the angle of arrival and other angular information for the object off which the transmitted chirp signals were reflected.

Figure 5:
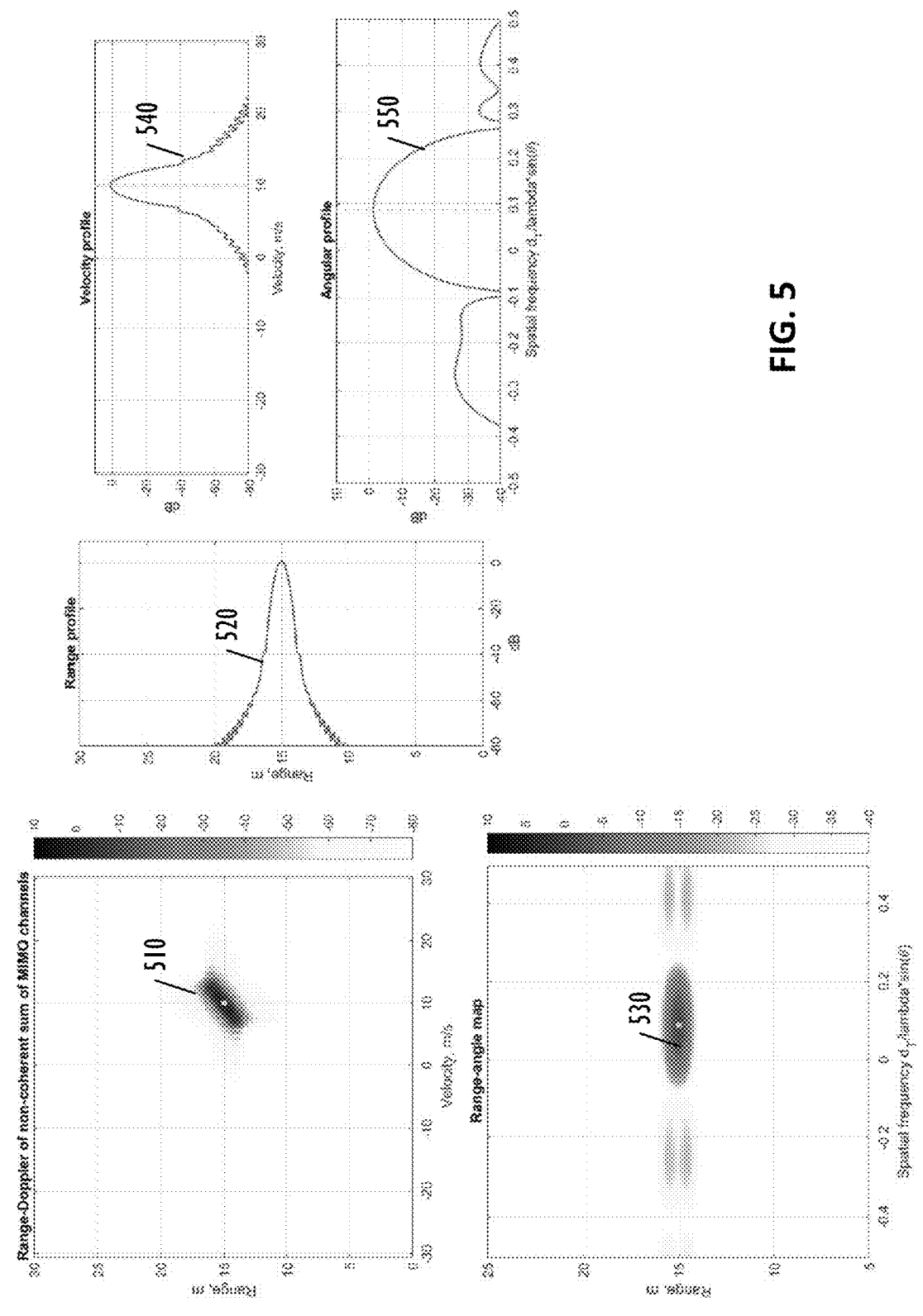
FIG. 5 shows diagrams for illustrating the performance of a MIMO radar system implementing a range-Doppler circulating LFM technique, according to one embodiment.

FIG. 5 shows diagrams illustrating the performance of a MIMO radar system with three transmitter channels and four receiver channels implementing a range-Doppler circulating LFM technique, such that the transmitter channels are each separated by 1.25 range cells and 1.25 Doppler cells, according to one embodiment. Application of a windowing function can help a radar system achieve higher dynamic ranges and detect larger numbers of objects in the environment relative to radar systems that do not implement windowing functions. Use of a windowing function can widen the main beam of an object response for each transmitter. As a result, the frequency spacing between transmitter channels is chosen in tandem with the parameters of the windowing function used on received radar data to improve the isolation of transmitters and the corresponding reliability of the beam-forming.

There are two consequences to applying a windowing function during range-Doppler processing. First, different time instances of the transmitted signal are related to dif-ference spatial locations towards the energy emitted by the transmitter. Appropriate weighting can make the gain applied to the received radar data angle-dependent. Second, the loss of orthogonality can degrade beam-forming, deter-mined by the increase in the side lobes of the angular profile. The frequency shift between transmitter channels can be chosen to reduce the cross correlation between channels after windowing.

In the example MIMO radar system with three transmitter channels and four receiver channels implementing a range-Doppler circulating LFM technique, the carrier frequency is 77 GigaHertz (GHz), the acquisition bandwidth is 400 MegaHertz (MHz), and the pulse repetition interval is 32 microseconds. Diagram 510 showing the range-Doppler map, diagram 520 showing the range profile, and diagram 540 showing the velocity profile indicate low and rapidly decreasing side-lobes. As illustrated in diagram 510, the range-Doppler circulating LFM multiplexing technique can experience some reduction in resolution along the diagonals of the range-Doppler map. Diagram 530 showing the range-angle map and diagram 550 showing the angular profile indicate that the side-lobes are slightly higher than expected for radar data after a Hann windowing function is applied, due to the loss of orthogonality between transmitter chan-nels. The dynamic range of the angular profile can be within acceptable ranges for many operating conditions.

As discussed previously herein, some techniques for multiplexing MIMO radar systems result in limited maxi-mum unambiguous ranges and velocities, limited range and velocity resolution, and the like. The disclosed range-Dop-pler circulating LFM technique and radar systems imple-menting the disclosed technique are able to multiplex trans-mitted signals without limiting the maximum unambiguous range and velocity or limiting the range and velocity reso-lution. The range-Doppler circulating LFM multiplexing technique introduces a carrier frequency offset, an in-band frequency offset, a phase offset, or a combination of thereof into the chirp signals transmitted by transmitters in the MIMO radar system relative to each other, such that the range-Doppler images for transmitters show peaks offset from each other in both range and Doppler. The carrier frequency offset, the in-band frequency offset, and the phase offset can be cancelled out from the received radar data, such that the range and velocity information about objects in the environment remains and the maximum unambiguous range, maximum unambiguous velocity, range resolution, and Doppler resolution remain the same as in a radar system with a single transmitter operating at a time.

Features specifically shown or described with respect to one embodiment set forth herein may be implemented in other embodiments set forth herein.

In this description, the term "couple" may cover connec-tions, communications, or signal paths that enable a func-tional relationship consistent with this description, including intermediate or intervening components that do not alter the functional relationship. A device that is "configured to" perform a task or function may be configured by program-ming or hardwiring, for example, at a time of manufacturing by a manufacturer and/or may be configurable or reconfig-urable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

A system includes first and second transmitters, a receiver, at least one processor, and at least one non-transitory com-puter-readable medium storing machine instructions. When executed by the at least one processor, the machine instruc-tions cause the at least one processor to cause the first transmitter to transmit a first chirp signal and the second transmitter to transmit a second chirp signal. The second chirp signal has an in-band frequency offset in fast-time and slow-time relative to the first chirp signal and at least one of a carrier frequency offset in slow-time and a phase offset relative to the first chirp signal. The receiver receives reflections of the first and second chirp signals off of objects in the environment to obtain a received radar signal. The at least one processor performs a range FFT on the received radar signal to obtain a range-slow-time-antenna data cube, and a Doppler FFT on the range-slow-time-antenna data cube to obtain a range-Doppler-antenna data cube. The at least one processor performs range-Doppler alignment of reflections of the first and second chirp signals to obtain an aligned range-Doppler-antenna data cube. The at least one processor then performs phase correction based on the phase offset of the second chirp signal relative to the first chirp signal and performs digital beamforming.

In some implementations, the machine instructions to perform range-Doppler alignment of reflections of the first and second chirp signals comprise machine instructions to copy the range-Doppler-antenna data cube to obtain a first range-Doppler-antenna data cube and a second range-Dop-pler-antenna data cube. The at least one processor then applies a circular shift to occupied cells in the second range-Doppler-antenna data cube by a number of range cells corresponding to the in-band frequency offset in fast-time and a number of Doppler cells corresponding to the in-band frequency offset in slow-time of the second chirp signal relative to the first chirp signal. In some implementations, the in-band frequency offset in fast-time is different from the in-band frequency offset in slow-time.

In implementations in which the second chirp signal has a phase offset relative to the first chirp signal, the machine instructions to perform phase correction comprise machine instructions to apply a first phase correction to the aligned range-Doppler-antenna data cube to compensate for the phase offset and apply a second phase correction to the aligned range-Doppler-antenna data cube to compensate for a phase offset resulting from the in-band frequency offset in fast-time. In some implementations, the machine instruc-tions to apply the first phase correction comprise machine instructions to multiply the aligned range-Doppler-antenna data cube by a complex conjugate of the phase offset. In some implementations, the machine instructions to apply the second phase correction comprise machine instructions to apply, to the aligned range-Doppler-antenna data cube, a delay-dependent phase correction per range bin offset based on a known slope of the second chirp signal.

In some implementations, the system also includes a chirp signal generator, a frequency and phase offset generator, and a mixer. The chirp signal generator is configured to generate a reference chirp signal. The frequency and phase offset generator is configured to generate a shift signal having the in-band frequency offset in fast-time and slow-time and the at least one of the carrier frequency offset and the phase offset. The mixer receives the reference signal from the chirp signal generator and the shift signal, and generates the second chirp signal. The reference chirp signal is provided to the first transmitter as the first chirp signal.

In some implementations, the in-band frequency offset is a first in-band frequency offset, the carrier frequency offset is a first carrier frequency offset, and the phase offset is a first phase offset. The system also includes a third transmitter, and the at least one non-transitory computer-readable medium further stores machine instructions to cause the third transmitter to transmit a third chirp signal having a second in-band frequency offset in fast-time and slow-time relative to the first chirp signal and at least one of a second carrier frequency offset in slow-time and a second phase offset relative to the first chirp signal. The receiver receives reflections of the first, second, and third chirp signals off of objects in the environment to obtain the received radar signal. The at least one processor performs range-Doppler alignment of reflections of the first, second, and third chirp signals to obtain the aligned range-Doppler-antenna data cube and performs phase correction based on the first phase offset of the second chirp signal relative to the first chirp signal and the second phase offset of the third chirp signal relative to the first chirp signal.

A non-transitory computer-readable medium stores machine instructions which, when executed by at least one processor, cause the at least one processor to cause a first transmitter to transmit a first chirp signal and one or more additional transmitters to transmit additional chirp signals. Each of the additional chirp signals have a unique in-band frequency offset in fast-time and slow-time relative to the first chirp signal and at least one of a unique carrier frequency offset in slow-time and a unique phase offset relative to the first chirp signal. The at least one processor causes a receiver to receive reflections of the first and additional chirp signals off of objects in the environment to obtain a received radar signal.

The at least one processor performs a range FFT on the received radar signal to obtain a range-slow-time-antenna data cube, and performs a Doppler FFT on the range-slow-time-antenna data cube to obtain a range-Doppler-antenna data cube. The at least one processor performs range-Doppler alignment of reflections of the first and additional chirp signals to obtain an aligned range-Doppler-antenna data cube and performs phase correction based on the unique phase offsets of the additional chirp signals relative to the first chirp signal. The at least one processor then performs digital beamforming.

In some implementations, the machine instructions to perform range-Doppler alignment of reflections of the first and additional chirp signals comprise machine instructions to copy the range-Doppler-antenna data cube to obtain a unique range-Doppler-antenna data cube for each of the first transmitter and the one or more additional transmitters. For each range-Doppler-antenna data cube corresponding to the one or more additional transmitters, the machine instructions cause the at least one processor to apply a circular shift to occupied cells in the range-Doppler-antenna data cube by a number of range cells corresponding to the unique in-band frequency offset in fast-time of the additional chirp signal relative to the first chirp signal and a number of Doppler cells corresponding to the unique in-band frequency offset in slow-time of the additional chirp signal relative to the first chirp signal. In some implementations, the unique in-band frequency offset in fast-time is different from the unique in-band frequency offset in slow-time.

In implementations in which the additional chirp signals have unique phase offsets relative to the first chirp signal, the machine instructions to perform phase correction include machine instructions to, for each range-Doppler-antenna data cube corresponding to the one or more additional transmitters, apply a first phase correction and a second phase correction to the aligned range-Doppler-antenna data cube. The first phase correction is chosen to compensate for the unique phase offset of the additional chirp signal relative to the first chirp signal, and the second phase is chosen to compensate for a phase offset resulting from the unique in-band frequency offset in fast-time.

In some implementations, the machine instructions to apply the first phase correction comprise machine instructions to multiply the aligned range-Doppler-antenna data cube by a complex conjugate of the unique phase offset. In some implementations, the machine instructions to apply the second phase correction comprise machine instructions to apply, to the aligned range-Doppler-antenna data cube, a delay-dependent phase correction per range bin offset based on a known slope of the additional chirp signal.

A method includes causing a first transmitter to transmit a first chirp signal and a second transmitter to transmit a second chirp signal. The second chirp signal has an in-band frequency offset in fast-time and slow-time relative to the first chirp signal and at least one of a carrier frequency offset in slow-time and a phase offset relative to the first chirp signal. A receiver receives reflections of the first and second chirp signals off of objects in the environment to obtain a received radar signal, and a range FFT is performed on the received radar signal to obtain a range-slow-time-antenna data cube. A Doppler FFT is performed on the range-slow-time-antenna data cube to obtain a range-Doppler-antenna data cube. Then, range-Doppler alignment of reflections of the first and second chirp signals is performed to obtain an aligned range-Doppler-antenna data cube. Phase correction is performed based on the phase offset of the second chirp signal relative to the first chirp signal, and digital beamforming is performed.

In some implementations, performing range-Doppler alignment of reflections of the first and second chirp signals includes copying the range-Doppler-antenna data cube to obtain a first range-Doppler-antenna data cube and a second range-Doppler-antenna data cube. A circular shift is applied to occupied cells in the second range-Doppler-antenna data cube by a number of range cells corresponding to the in-band frequency offset in fast-time and a number of Doppler cells corresponding to the in-band frequency offset in slow-time of the second chirp signal relative to the first chirp signal. In some implementations, the in-band frequency offset in fast-time is different from the in-band frequency offset in slow-time.

In implementations in which the second chirp signal has a phase offset relative to the first chirp signal, performing phase correction can include applying a first phase correction and a second phase correction to the aligned ranged-Doppler-antenna data cube. The first phase correction is chosen to compensate for the phase offset, and the second phase correction is chosen to compensate for a phase offset resulting from the in-band frequency offset in fast-time. In some implementations, applying the first phase correction includes multiplying the aligned range-Doppler-antenna data cube by a complex conjugate of the phase offset. In some implementations, applying the second phase correction includes applying, to the aligned range-Doppler-antenna data cube, a delay-dependent phase correction per range bin offset based on a known slope of the second chirp signal.

What is claimed is:

1. A system comprising:

a first transmitter and a second transmitter;

a receiver;

at least one processor; and at least one non-transitory computer-readable medium storing machine instructions which, when executed by the at least one processor, cause the at least one processor to:

cause the first transmitter to transmit a first chirp signal;

cause the second transmitter to transmit a second chirp signal having an in-band frequency offset in fast-time and slow-time relative to the first chirp signal and at least one of a carrier frequency offset in slow-time and a phase offset relative to the first chirp signal;

cause the receiver to receive reflections of the first and second chirp signals from objects in the environment to obtain a received radar signal;

perform a range fast Fourier transform (FFT) on the received radar signal to obtain a range-slow-time-antenna data cube;

perform a Doppler FFT on the range-slow-time-antenna data cube to obtain a range-Doppler-antenna data cube;

perform range-Doppler alignment of reflections of the first and second chirp signals to obtain an aligned range-Doppler-antenna data cube by:

copying the range-Doppler-antenna data cube to obtain a first range-Doppler-antenna data cube and a second range-Doppler-antenna data cube; and applying a circular shift to occupied cells in the second range-Doppler-antenna data cube by a number of range cells corresponding to the in-band frequency offset in fast-time and a number of Doppler cells corresponding to the in-band frequency offset in slow-time of the second chirp signal relative to the first chirp signal;

perform phase correction based on the phase offset of the second chirp signal relative to the first chirp signal; and perform digital beamforming.

2. The system of claim 1, wherein the in-band frequency offset in fast-time is different from the in-band frequency offset in slow-time.

3. The system of claim 1, wherein the second chirp signal has a phase offset relative to the first chirp signal, and wherein the machine instructions to perform phase correction comprise machine instructions to:

apply a first phase correction to the aligned range-Doppler-antenna data cube to compensate for the phase offset; and apply a second phase correction to the aligned range-Doppler-antenna data cube to compensate for a phase offset resulting from the in-band frequency offset in fast-time.

4. The system of claim 3, wherein the machine instructions to apply the first phase correction comprise machine instructions to multiply the aligned range-Doppler-antenna data cube by a complex conjugate of the phase offset.

5. The system of claim 3, wherein the machine instructions to apply the second phase correction comprise machine instructions to apply, to the aligned range-Doppler-antenna data cube, a delay-dependent phase correction per range bin offset based on a known slope of the second chirp signal.

6. The system of claim 1, further comprising:

a chirp signal generator configured to generate a reference chirp signal;

a frequency and phase offset generator configured to generate a shift signal having the in-band frequency offset in fast-time and slow-time and the at least one of the carrier frequency offset and the phase offset; and a mixer, wherein the at least one non-transitory computer-readable medium further stores machine instructions which, when executed by the at least one processor, cause the at least one processor to:

cause the chirp signal generator to provide the reference chirp signal to the mixer, and to the first transmitter as the first chirp signal;

cause the frequency and phase offset generator to generate the shift signal;

cause the frequency and phase offset generator to provide the shift signal to the mixer;

cause the mixer to generate the second chirp signal based on the reference chirp signal and the shift signal; and cause the mixer to provide the second chirp signal to the second transmitter.

7. The system of claim 1, further comprising a third transmitter, wherein:

the in-band frequency offset is a first in-band frequency offset, the carrier frequency offset is a first carrier frequency offset, and the phase offset is a first phase offset; and the at least one non-transitory computer-readable medium further stores machine instructions which, when executed by the at least one processor, cause the at least one processor to:

cause the third transmitter to transmit a third chirp signal having a second in-band frequency offset in fast-time and slow-time relative to the first chirp signal and at least one of a second carrier frequency offset in slow-time and a second phase offset relative to the first chirp signal;

cause the receiver to receive reflections of the first, second, and third chirp signals from objects in the environment to obtain the received radar signal;

perform range-Doppler alignment of reflections of the first, second, and third chirp signals to obtain an aligned range-Doppler-antenna data cube; and perform phase correction based on the first phase offset of the second chirp signal relative to the first chirp signal and the second phase offset of the third chirp signal relative to the first chirp signal.

8. A non-transitory computer-readable medium storing machine instructions which, when executed by at least one processor, cause the at least one processor to:

cause a first transmitter to transmit a first chirp signal;

cause one or more additional transmitters to transmit additional chirp signals, wherein each of the additional chirp signals have a unique in-band frequency offset in fast-time and slow-time relative to the first chirp signal and at least one of a unique carrier frequency offset in slow-time and a unique phase offset relative to the first chirp signal;

cause a receiver to receive reflections of the first and additional chirp signals from off of objects in the environment to obtain a received radar signal;

perform a range fast Fourier transform (FFT) on the received radar signal to obtain a range-slow-time-antenna data cube;

perform a Doppler FFT on the range-slow-time-antenna data cube to obtain a range-Doppler-antenna data cube;

perform range-Doppler alignment of reflections of the first and additional chirp signals to obtain an aligned range-Doppler-antenna data cube by:

copying the range-Doppler-antenna data cube to obtain a unique range-Doppler-antenna data cube for each of the first transmitter and the one or more additional transmitters; and for each range-Doppler-antenna data cube corresponding to the one or more additional transmitters, applying a circular shift to occupied cells in the range-Doppler-antenna data cube by a number of range cells corresponding to the unique in-band frequency offset in fast-time of the additional chirp signal relative to the first chirp signal and a number of Doppler cells corresponding to the unique in-band frequency offset in slow-time of the additional chirp signal relative to the first chirp signal;

perform phase correction based on the unique phase offsets of the additional chirp signals relative to the first chirp signal; and perform digital beamforming.

9. The non-transitory computer-readable medium of claim 8, wherein the unique in-band frequency offset in fast-time is different from the unique in-band frequency offset in slow-time.

10. The non-transitory computer-readable medium of claim 8, wherein the additional chirp signals have unique phase offsets relative to the first chirp signal, and wherein the machine instructions to perform phase correction comprise machine instructions to, for each range-Doppler-antenna data cube corresponding to the one or more additional transmitters:

apply a first phase correction to the aligned range-Doppler-antenna data cube to compensate for the unique phase offset of the additional chirp signal relative to the first chirp signal; and apply a second phase correction to the aligned range-Doppler-antenna data cube to compensate for a phase offset resulting from the unique in-band frequency offset in fast-time.

11. The non-transitory computer-readable medium of claim 10, wherein the machine instructions to apply the first phase correction comprise machine instructions to multiply the aligned range-Doppler-antenna data cube by a complex conjugate of the unique phase offset.

12. The non-transitory computer-readable medium of claim 10, wherein the machine instructions to apply the second phase correction comprise machine instructions to apply, to the aligned range-Doppler-antenna data cube, a delay-dependent phase correction per range bin offset based on a known slope of the additional chirp signal.

13. A method comprising:

causing a first transmitter to transmit a first chirp signal;

causing a second transmitter to transmit a second chirp signal having an in-band frequency offset in fast-time and slow-time relative to the first chirp signal and at least one of a carrier frequency offset in slow-time and a phase offset relative to the first chirp signal;

causing a receiver to receive reflections of the first and second chirp signal froms objects in the environment to obtain a received radar signal;

performing a range fast Fourier transform (FFT) on the received radar signal to obtain a range-slow-time-antenna data cube;

performing a Doppler FFT on the range-slow-time-antenna data cube to obtain a range-Doppler-antenna data cube;

performing range-Doppler alignment of reflections of the first and second chirp signals to obtain an aligned range-Doppler-antenna data cube by:

copying the range-Doppler-antenna data cube to obtain a first range-Doppler-antenna data cube and a second range-Doppler-antenna data cube; and applying a circular shift to occupied cells in the second range-Doppler-antenna data cube by a number of range cells corresponding to the in-band frequency offset in fast-time and a number of Doppler cells corresponding to the in-band frequency offset in slow-time of the second chirp signal relative to the first chirp signal;

performing phase correction based on the phase offset of the second chirp signal relative to the first chirp signal; and performing digital beamforming.

14. The method of claim 13, wherein the in-band frequency offset in fast-time is different from the in-band frequency offset in slow-time.

15. The method of claim 13, wherein the second chirp signal has a phase offset relative to the first chirp signal, and wherein performing phase correction comprises:

applying a first phase correction to the aligned range-Doppler-antenna data cube to compensate for the phase offset; and applying a second phase correction to the aligned range-Doppler-antenna data cube to compensate for a phase offset resulting from the in-band frequency offset in fast-time.

16. The method of claim 15, wherein applying the first phase correction comprises multiplying the aligned range-Doppler-antenna data cube by a complex conjugate of the phase offset.

17. The method of claim 15, wherein applying the second phase correction comprises applying, to the aligned range-Doppler-antenna data cube, a delay-dependent phase correction per range bin offset based on a known slope of the second chirp signal.

18. The method of claim 13, wherein performing the range FFT includes applying a windowing function including parameters corresponding to frequency spacing between channels of at least the first transmitter and the second transmitter.

19. The system of claim 1, wherein the machine instructions that cause the at least one processor to perform the range FFT further comprise machine instructions that cause the at least one processor to apply a windowing function including parameters corresponding to frequency spacing between channels of at least the first transmitter and the second transmitter.

20. The non-transitory computer-readable medium of claim 8, wherein the machine instructions that cause the at least one processor to perform the range FFT further comprise machine instructions that cause the at least one processor to apply a windowing function including parameters corresponding to frequency spacing between channels of at least the first transmitter and the second transmitter.

\* \* \* \* \*